H. F. MALONEY.
FARM GATE.
APPLICATION FILED MAR. 25, 1912.
1,058,612.
Patented Apr. 8, 1913.
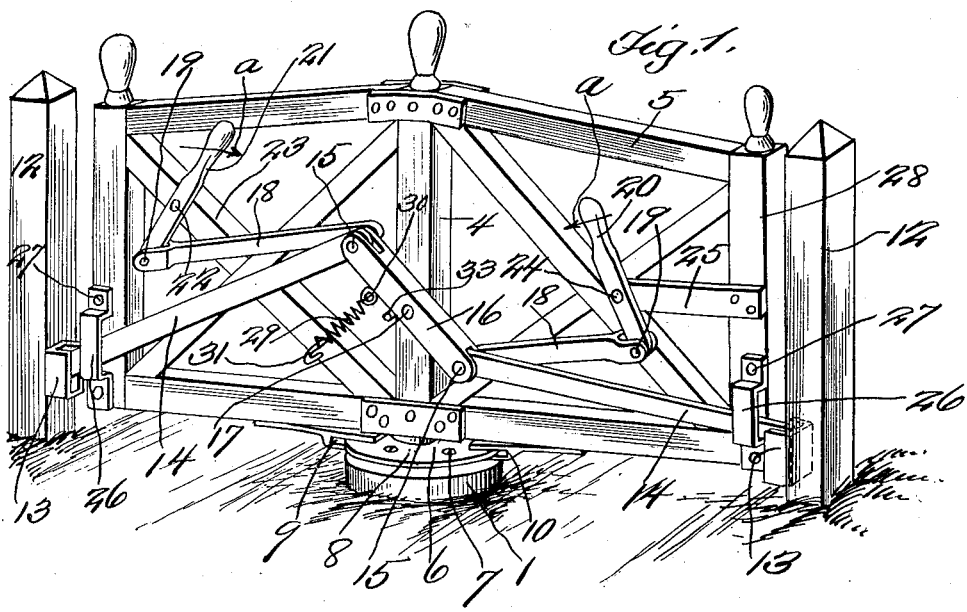
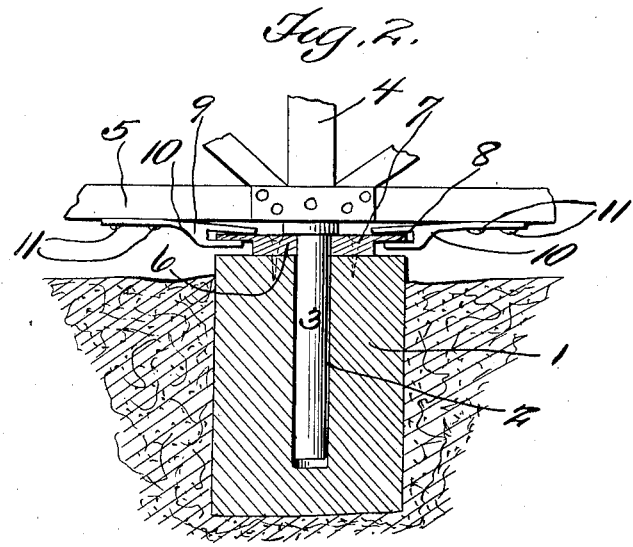

UNITED STATES PATENT OFFICE.

HENRY F. MALONEY, OF ROZEL, KANSAS.

FARM-GATE.

1,058,612.   Specification of Letters Patent.   Patented Apr. 8, 1913.

Application filed March 25, 1912. Serial No. 686,010.

*To all whom it may concern:*

Be it known that I, HENRY F. MALONEY, a citizen of the United States, residing at Rozel, in the county of Pawnee and State of Kansas, have invented a new and useful Farm-Gate; and I do hereby declare the following to be a full, clear, and exact description of the invention, such as will enable others skilled in the art to which it appertains to make and use the same.

This invention relates to a new and useful farm gate.

The principal object of the invention is to provide a farm gate mounted upon a single fulcrum, so as to swing in either direction, whereby a vehicle or the like may pass by the gate on each side of the fulcrum, at the same time and going in opposite directions.

A further feature of the invention is the provision of suitable latches at each end of the gate, so constructed and connected that, as one latch is manipulated, the other in turn is operated, whereby each end of the gate may be released simultaneously.

A further feature of the invention is the provision of novel means for steadying the gate as it is moved upon its fulcrum.

The invention comprises further features and combinations of parts, as hereinafter set forth, shown in the drawings and claimed.

In the drawings, Figure 1 is a view in perspective of a farm gate constructed in accordance with the invention. Fig. 2 is a detail sectional view through the fulcrum of the gate.

Referring to the drawings, 1 designates a base member having a socket 2. Extending into the socket is a spindle 3, which projects from the lower portion of the central post or beam 4 of the gate 5. This spindle 3 also passes through the plate 6, which is secured to the base 1 by screws or the like 7. The plate 6 is provided with an annular flange 8 which is engaged by the forked ends 9 of the members 10. These members 10 are secured at 11 to the under portion of the gate, as shown in Figs. 1 and 2. By virtue of the members 10, the gate 5 is steadied as it is oscillated upon its fulcrum, and, furthermore, prevents the gate from being accidentally disconnected from its fulcrum. Owing to the fact that the metal, between the forked portions or ends of the members 10 and where the members are secured to the gate, is comparatively thin, resiliency is afforded, thereby allowing each end of the gate to yield slightly, and right itself. In other words, the equilibrium of the gate is maintained. This is further insured, owing to the fact that the forked ends are offset slightly.

When the gate is closed, the same is arranged between two posts 12, adjacent the lower portion of which keepers 13 are secured, as shown in Figs. 1 and 2. The keepers 13 receive the latch bars 14, which are, in turn, pivotally connected, as at 15, to an oscillating beam 16. The beam 16 is pivoted upon a pin 17 of the post 4, as shown in Fig. 1. Also pivoted at the points 15 are the links 18, which are, in turn, pivotally connected, as at 19, to the operating levers 20 and 21. The operating lever 21 is pivotally mounted upon a pin 22 of the diagonally arranged beam 23 of the gate, while the operating lever 20 is pivoted upon a pin 24 of the arm 25. The latch bars 14 are guided in their movements by the bracket plates 26, which are secured at 27 to the end posts or beams 28 of the gate 5. The latch bars are held in the keepers 13 by virtue of the spring 29, one end of which is connected at 30 to the oscillating beam 16, while the other end is connected, as at 31, to the diagonally disposed beam 23. By operating the levers 20 and 21 in the directions indicated by the arrows *a*, the latch bars 14 may be withdrawn from their keepers, which will permit the gate to be swung upon its fulcrum, thus enabling a person or a vehicle or the like to pass by the gate on either side of the fulcrum. When one or the other of the operating levers is released, the spring 29 returns the latch bars to their normal positions, and the oscillating beam 16 is limited in its movement by the pin 33, so that the latch bars may not be thrown outwardly farther than necessary, when the gate is opened.

From the foregoing, it will be noted that there has been produced a novel, simple and efficient farm gate.

The invention having been set forth, what is claimed as new and useful is:—

In a farm gate having latching means and fulcrumed midway of its ends; a base member having a socket, a plate secured to the base member detachably and provided with an annular offset flange, said plate having an opening registering with said socket, a gate having a spindle extending through said opening and into said socket thereby constituting the fulcrum of said gate, the spindle having a collar arranged between the plate and the gate to hold the gate spaced apart from the plate, and a pair of members, one secured to the gate upon each side of the spindle, and provided with resilient portions terminating in forks sprung offset from the gate and adapted to arch said offset flange, thereby constituting means for maintaining the equilibrium of the gate in a yieldable manner.

In testimony whereof I have signed my name to this specification in the presence of two subscribing witnesses.

HENRY F. MALONEY.

Witnesses:
W. R. DUNCAN,
ROSCOE H. WILSON.

---

Copies of this patent may be obtained for five cents each, by addressing the " Commissioner of Patents, Washington, D. C."